(12) United States Patent
Cheatham, III et al.

(10) Patent No.: US 9,564,766 B2
(45) Date of Patent: Feb. 7, 2017

(54) CONTROLLABLE ENERGY TRANSFER BETWEEN PORTABLE DEVICES

(71) Applicant: Elwha LLC, Bellevue, WA (US)

(72) Inventors: Jesse R. Cheatham, III, Seattle, WA (US); Eun Young Hwang, San Francisco, CA (US); Roderick A. Hyde, Redmond, WA (US); Tony S. Pan, Bellevue, WA (US); Robert C. Petroski, Seattle, WA (US); Clarence T. Tegreene, Mercer Island, WA (US); Thomas A. Weaver, San Mateo, CA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 154 days.

(21) Appl. No.: 14/447,480

(22) Filed: Jul. 30, 2014

(65) Prior Publication Data
US 2016/0036259 A1 Feb. 4, 2016

(51) Int. Cl.
*H02J 7/00* (2006.01)
*H02J 9/06* (2006.01)

(52) U.S. Cl.
CPC ............ *H02J 7/0054* (2013.01); *H02J 7/0004* (2013.01); *H02J 7/00* (2013.01); *H02J 7/008* (2013.01); *H02J 9/061* (2013.01); *H02J 2007/0062* (2013.01); *H02J 2007/0096* (2013.01); *Y02T 10/7005* (2013.01)

(58) Field of Classification Search
CPC ........ H02J 7/025; H02J 7/0042; H02J 7/0044; H02J 7/0062; H02J 7/0054; H02J 7/045; H02J 7/00; H02J 7/0021; H02J 7/0047; H02J 7/008; H02J 9/061
See application file for complete search history.

(56) References Cited

U.S. PATENT DOCUMENTS

| | | | | | |
|---|---|---|---|---|---|
| 8,584,243 | B2* | 11/2013 | Britton | .................... | G06F 21/56 713/188 |
| 8,860,371 | B2* | 10/2014 | Yang | ..................... | H02J 7/0024 320/113 |
| 2005/0151511 | A1 | 7/2005 | Chary | | |
| 2011/0208980 | A1 | 8/2011 | Brooks et al. | | |
| 2012/0150550 | A1* | 6/2012 | Belady | ................... | G06Q 10/30 705/1.1 |

(Continued)

FOREIGN PATENT DOCUMENTS

KR WO 2012153890 * 11/2012

*Primary Examiner* — Helen Rossoshek
(74) *Attorney, Agent, or Firm* — Foley & Lardner LLP

(57) ABSTRACT

An energy transfer apparatus includes a cable having first end with a first connector operably coupled thereto and a second end with a second connector operably coupled thereto. The energy transfer apparatus also includes a control unit coupled to the cable. The control unit includes a device interface module configured to determine a first energy parameter of a first portable device connected to the cable via the first connector and to determine a second energy parameter of a second portable device connected to the cable via the second connector. The control unit also includes an energy transfer module configured to facilitate energy transfer between the first and second portable devices based on the first and second energy parameters.

35 Claims, 8 Drawing Sheets

(56) References Cited

U.S. PATENT DOCUMENTS

| | | | | |
|---|---|---|---|---|
| 2013/0043827 A1* | 2/2013 | Weinstein | ............ | H02J 7/0042 320/103 |
| 2013/0069583 A1* | 3/2013 | Lemelman | ............ | G06F 1/1635 320/107 |
| 2013/0117850 A1* | 5/2013 | Britton | ................. | G06F 21/567 726/23 |
| 2013/0173829 A1* | 7/2013 | Chan | ....................... | G06F 21/00 710/17 |
| 2014/0038527 A1* | 2/2014 | Chen | .................... | H04W 4/008 455/41.3 |
| 2014/0049208 A1* | 2/2014 | Carkner | ............. | H01M 2/1005 320/103 |
| 2014/0132224 A1* | 5/2014 | Pisharodi | ............... | H02J 7/027 320/149 |
| 2015/0120501 A1* | 4/2015 | Jung | ....................... | H04L 63/10 705/26.41 |
| 2015/0141086 A1* | 5/2015 | Chan | ................ | H04M 1/72575 455/575.1 |
| 2015/0320196 A1* | 11/2015 | Polizzi | .................... | A47B 5/04 320/101 |
| 2015/0357834 A1* | 12/2015 | McLean | ............... | H02J 7/0054 307/31 |

\* cited by examiner

CONTROLLABLE ENERGY TRANSFER BETWEEN PORTABLE DEVICES

BACKGROUND

Portable devices such as mobile telephones, laptop computers, and the like often utilize rechargeable energy storage devices such as rechargeable batteries as a source of power. From time to time, the battery of a portable device will run low and a user will not have access to a charger to recharge the battery. This may be the case, for example, if a user is commuting on a transit vehicle. However, as such portable devices are becoming more and more ubiquitous, the user may have access to another portable device with ample energy.

SUMMARY

One embodiment relates to an energy transfer apparatus. The energy transfer apparatus includes a cable having first end with a first connector operably coupled thereto and a second end with a second connector operably coupled thereto. The energy transfer apparatus also includes a control unit coupled to the cable. The control unit includes a device interface module configured to determine a first energy parameter of a first portable device connected to the cable via the first connector and to determine a second energy parameter of a second portable device connected to the cable via the second connector. The control unit also includes an energy transfer module configured to facilitate energy transfer between the first and second portable devices based on the first and second energy parameters.

Another embodiment relates to a method of transferring energy between portable devices. The method includes detecting, by an energy transfer device, a first connection of a first portable device and determining a first energy parameter of the first portable device. The method also includes detecting, by the energy transfer device, a second connection of a second portable device and determining a second energy parameter of the second portable device. The method further includes transferring, by the energy transfer device, energy between the first and second portable devices based on the first and second energy parameters.

Another embodiment relates to a method of transferring energy between portable devices. The method includes determining a first energy parameter of a first portable device, determining a second energy parameter of a second portable device, and determining an energy transfer parameter. The method also includes transferring energy between the first and second portable devices based on the first and second energy parameters and further based on the energy transfer parameter. The method further includes monitoring energy transferred between the first and second portable devices and stopping the transferring of energy transfer between the first and second portable devices upon detecting an energy transfer completion indicator.

Another embodiment relates to a method of transferring energy between portable devices. The method includes receiving an input comprising an energy transfer parameter associated with an identifier of a first portable device. The method also includes detecting a first connection of the first portable device and detecting a second connection of a second portable device. The method further includes transferring energy between the first and second portable devices based on the energy transfer parameter.

The foregoing summary is illustrative only and is not intended to be in any way limiting. In addition to the illustrative aspects, embodiments, and features described above, further aspects, and embodiments, and features will become apparent by reference to the drawings and the following detailed description.

BRIEF DESCRIPTION

Figure 8:
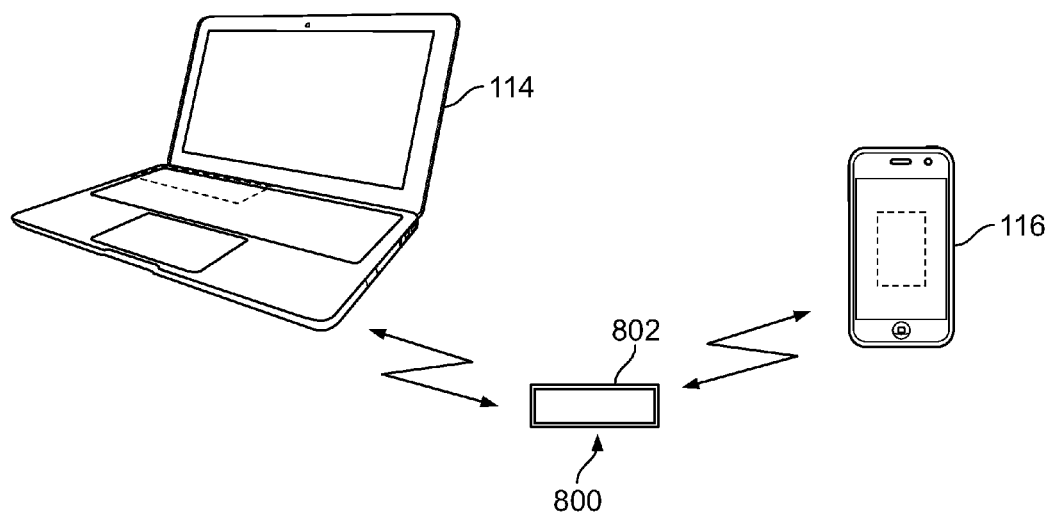

FIG. 8 a perspective view of an energy transfer device connected to two portable devices according to one embodiment.

Figure 9:
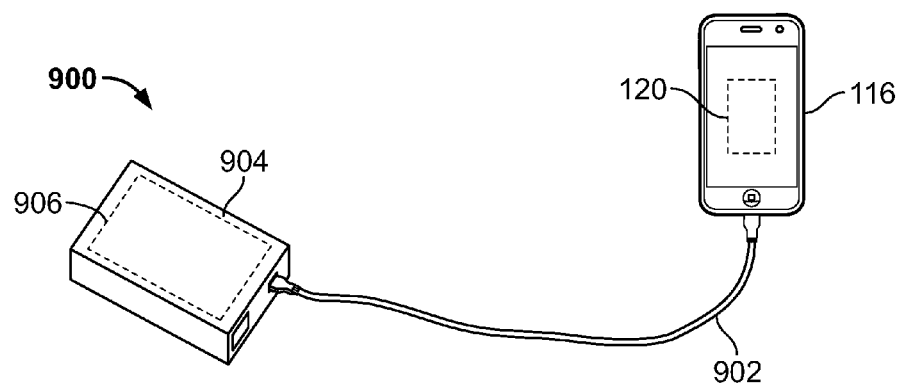

FIG. 9 is a perspective view of an energy transfer device connected to a portable device according to one embodiment.

Figure 10:
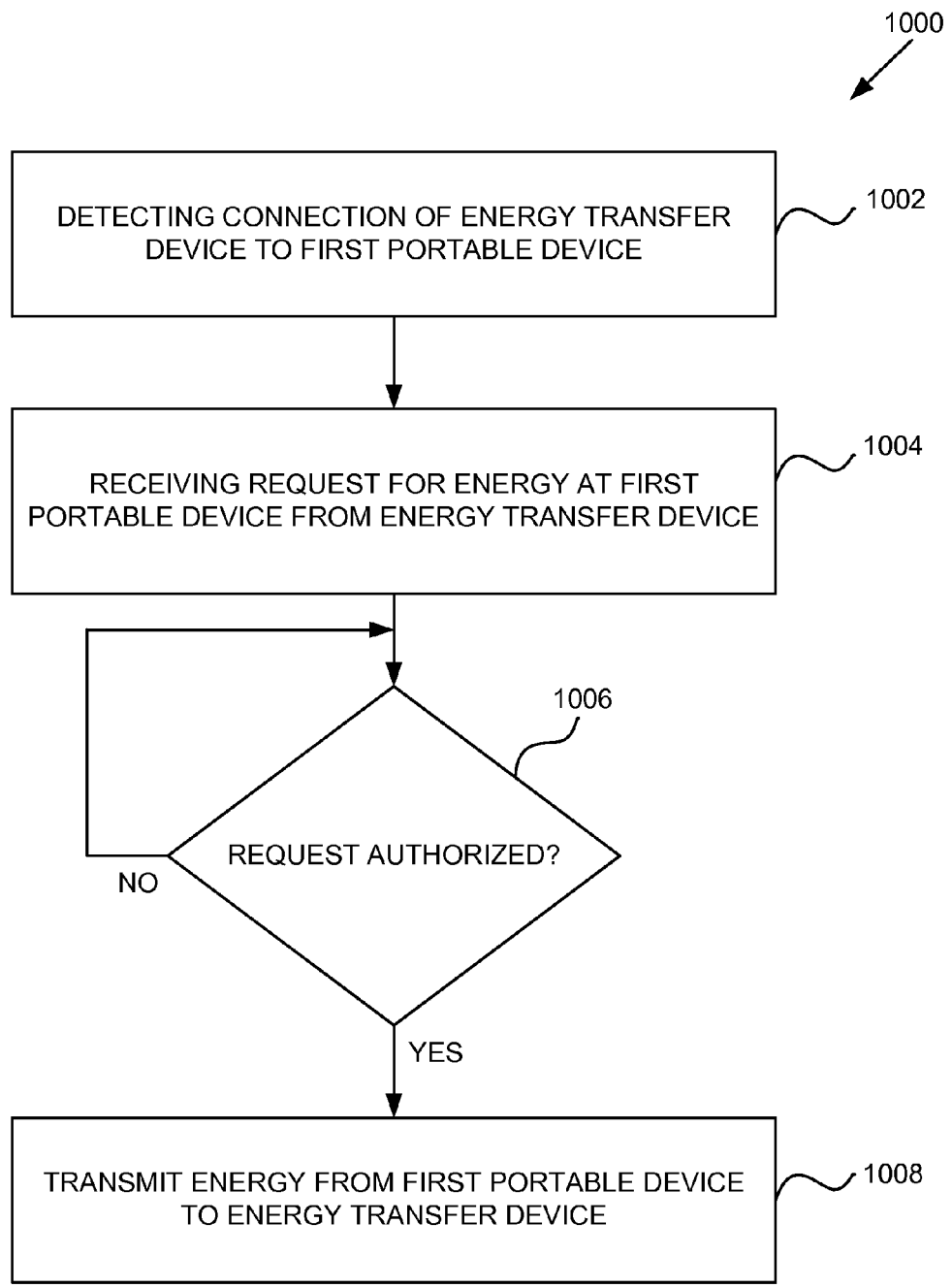

FIG. 10 is a flow diagram of a method for the delivery of energy from a portable device, according to one embodiment.

Figure 11:
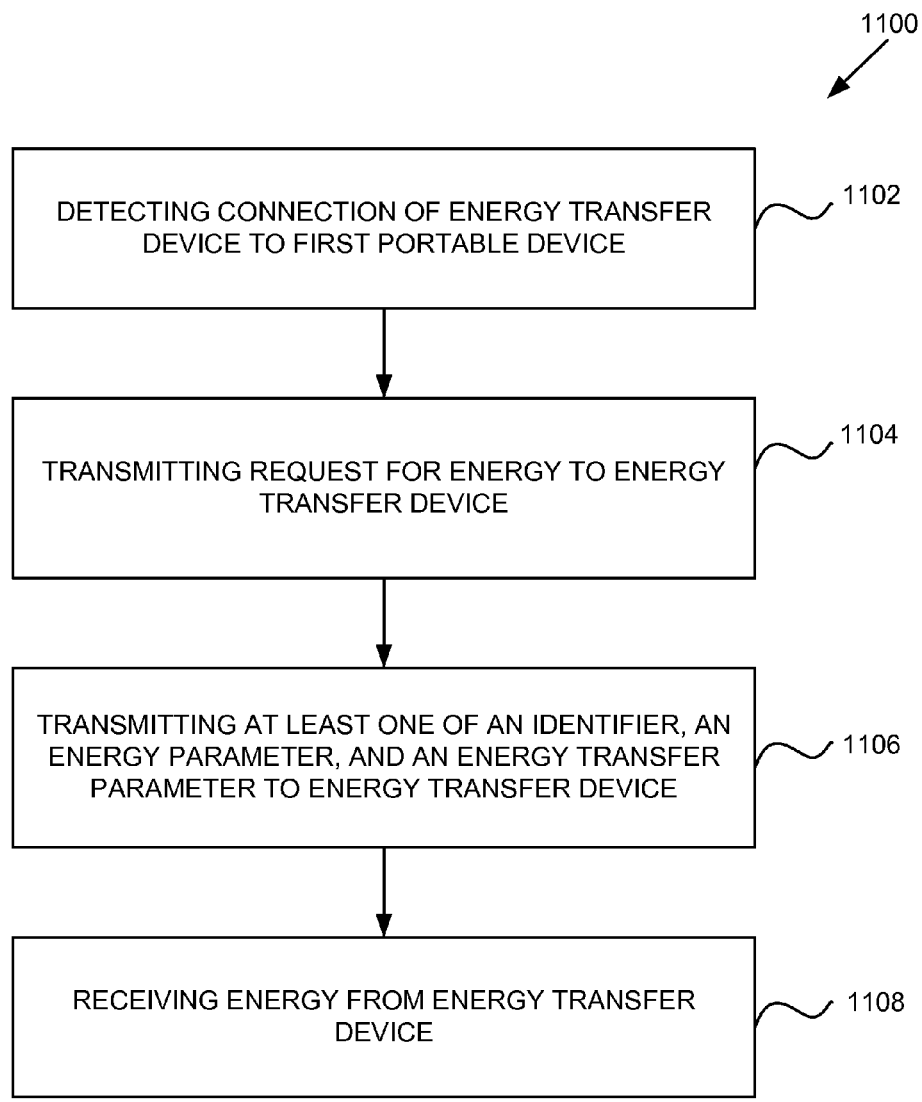

FIG. 11 is a flow diagram of a method for the reception of energy by a portable device, according to one embodiment.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Most portable devices (e.g., portable electronic devices such as laptop computers, mobile telephones, tablet computers, etc.) are not capable of transferring energy to other portable devices. Certain portable devices (e.g., laptop computers) may be capable of transferring energy to another portable device (e.g., a mobile telephone) connected thereto via a cable, such as a universal serial bus (USB) cable, for example. However, such devices often have to be powered on for energy to be transferred therefrom. In addition, a user has limited control over the energy transfer. For example, the user may not be able to control how much energy is being transferred, the transfer rate, and/or how much energy the host device retains.

In addition, portable devices are typically configured to receive energy having specific characteristics, such as format (e.g., direct current (DC)) and power rating (e.g., voltage and current), for example. For example, a mobile telephone may be configured to receive DC power at 5 volts and 850 milliamperes, while a laptop computer may be configured to receive DC power at 15 volts and 3 amperes. Transferring energy to a portable device in a different format and/or at levels exceeding its specific power rating may permanently damage the device.

Figure 1:
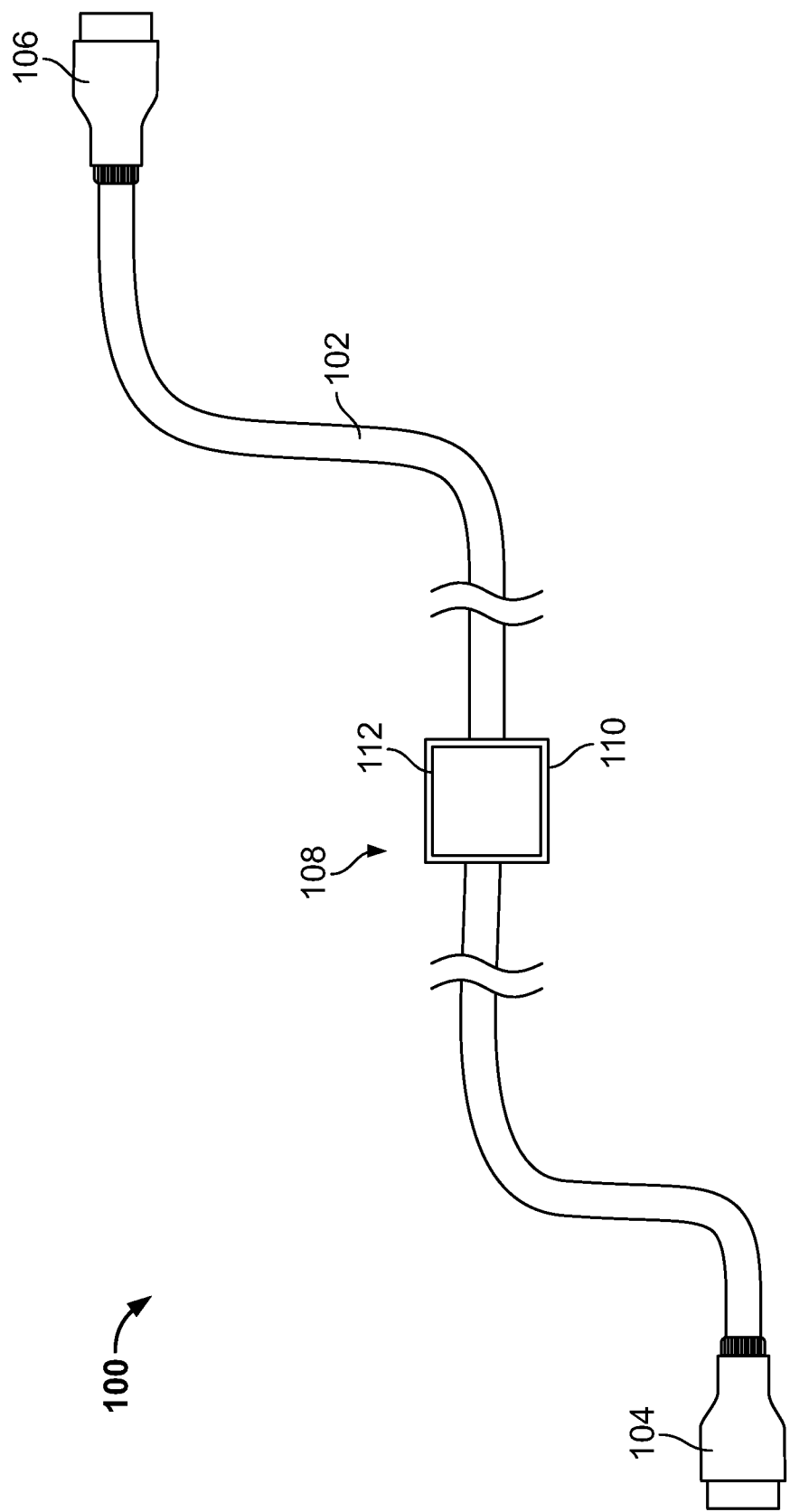
FIG. 1 is a plan view of an energy transfer device according to one embodiment.

FIG. 1 illustrates energy transfer device 100 that is capable of intelligent energy transfer between devices (e.g., portable devices), according to one embodiment. Energy transfer device 100 includes cable 102 that extends between first connector 104 operatively coupled to cable 102 at one end to second connector 106 operatively coupled to cable 102 at another end. Cable 102 includes one or more conductors (e.g., copper wires) (not shown) extending between first and second connectors 104, 106 to transmit energy and/or data. In some embodiments, cable 102 includes one or more optical fibers; these may be used for optical energy transfer, may be used for optical data transfer, or may be used for both (either using the same fiber or separate ones). In some embodiments, cable 102 includes both one or more conductors as well as one or more optical fibers. In various embodiments, first and second connectors 104, 106 are universal serial bus (USB) connectors, mini-USB connectors, micro-USB connectors, or any of various standard or proprietary connectors. Certain embodiments further include adapters to accommodate various types of connectors. First and second connectors 104, 106 operatively and detachably couple cable 102 to portable or other devices so that energy and/or information may be transferred therefrom and therebetween.

In one embodiment, energy transfer device 100 also includes control unit 108 operatively coupled to cable 102. Control unit 108 includes housing 110 and input/output device 112. Housing 110 encloses various electronic components (not shown) including processing circuits configured to perform functionality such as, for example, interfacing and communicating with devices, intelligently controlling energy transfer between devices, accepting and processing user inputs, and operating a display, among other things. Input/output device 112 may include a display (e.g., a liquid crystal display (LCD) screen) and/or a user input device (e.g., a touch screen and/or buttons). In some embodiments input/output device 112 may include audio components such as a microphone to accept verbal input and/or a speaker to provide audible output.

In some embodiments, control unit 108 is integral to cable 102. For example, control unit 108 may be disposed near a midpoint of cable 102 or formed in a sheath of cable 102. In other embodiments, control unit 108 is a discrete component that is separate from cable 102. For example, in some embodiments, control unit 108 is disposed in an adapter operably coupled to cable 102. In certain embodiments, control unit 108 does not include input/output device 112. In such embodiments, for example, energy transfer device 100 may automatically transfer energy between devices without receiving user inputs. In such cases, energy transfer device 100 may automatically transfer energy based upon input from one or both of the portable devices attached to it, and/or based upon instructions previously stored within control unit 108. In other embodiments, input/output device 112 is provided via an application running on at least one of the devices to which energy transfer device 100 is connected.

In some embodiments, energy transfer device 100 is directionally agnostic, such that either of the devices to which it is connected can be selected as a host device or as a recipient device, regardless of whether they are connected to energy transfer device 100 via first connector 104 or second connector 106. In other embodiments, energy transfer device 100 is directional, such that a device connected to one of first or second connectors 104, 106 is always the host device or the recipient device. For example, in some embodiments, the device connected to first connector 104 is always the host device. As used herein, the term "host device" refers to a device from which energy is transferred and the term "recipient device" refers to a device to which energy is transferred.

In some embodiments, control unit 108 includes an internal battery to power the internal processing and input/output needs of energy transfer device 100. In some embodiments the internal battery is a primary battery; in others it is a secondary battery designed for recharging from an external power source (e.g., an AC wall plug outlet). In other embodiments, control unit 108 includes a secondary battery configured to obtain (e.g., "pirate") energy from one or more devices to which it is connected. In further embodiments, control unit 108 includes a battery to perform initial wake-up commands, which is recharged by pirating energy from a device once the device is connected thereto. In other embodiments, control unit 108 includes a relatively high-capacity internal secondary battery to receive and/or transmit energy to and from devices or other energy sources.

Figure 2:
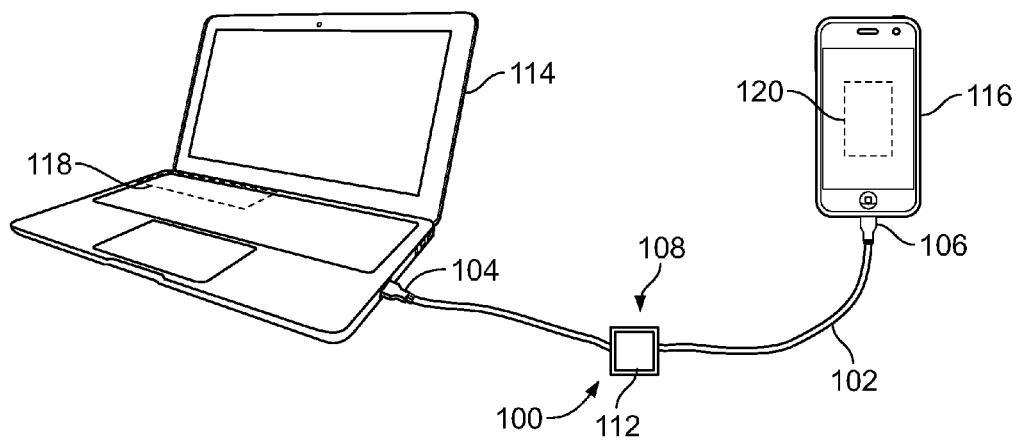
FIG. 2 is a perspective view of the energy transfer device of FIG. 1 connected to two portable devices according to one embodiment.

FIG. 2 illustrates energy transfer device 100 operatively coupled to first portable device 114 and second portable device 116. For example, first portable device 114 may be a laptop computer with rechargeable battery 118 that has ample energy, and second portable device 116 may be a mobile telephone with rechargeable battery 120 that is running low on energy. Energy transfer device 100 allows energy to be transferred from first portable device 114 to second portable device 116.

Figure 3:
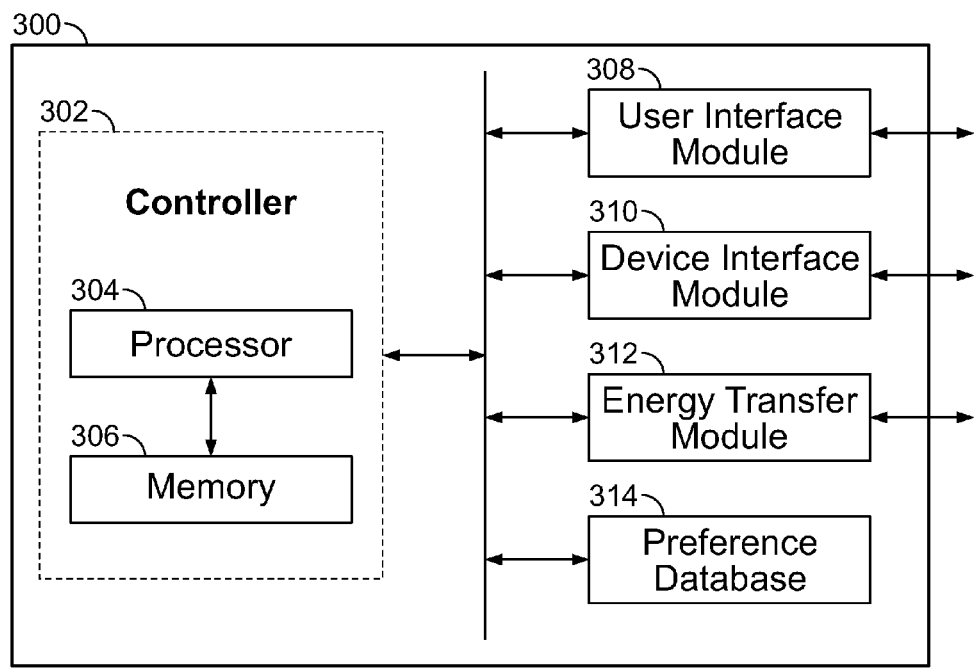
FIG. 3 is a block diagram of a processing circuit of the energy transfer device of FIG. 1.

Referring to FIG. 3, a block diagram of processing circuit 300 of energy transfer device 100 is shown according to one embodiment. In an embodiment, processing circuit 300 can be implemented by control unit 108 of energy transfer device 100. Processing circuit 300 includes controller 302, which controls the various modules of processing circuit 300. Controller 302 includes processor 304 and memory 306. Processor 304 may be implemented as a general-purpose processor, an application specific integrated circuit (ASIC), one or more field programmable gate arrays (FPGAs), a digital-signal-processor (DSP), a group of processing components, or other suitable electronic processing components. Memory 306 is one or more devices (e.g., RAM, ROM, Flash Memory, hard disk storage, etc.) for storing data and/or computer code for facilitating the various processes described herein. Memory 306 may be or include non-transient volatile memory or non-volatile memory. Memory 306 may include database components, object code components, script components, or any other type of information structure for supporting the various activities and information structures described herein. Memory 306 may be communicably connected to processor 304 and provide computer code or instructions to processor 304 for executing the processes described herein.

Controller 302 is in communication with user interface module 308, device interface module 310, energy transfer module 312, and preference database 314, which control various aspects of the operation of energy transfer device 100.

User interface module 308 is configured provide various outputs to and to receive various inputs from a user. In some embodiments, user interface module 308 is configured to display various types of information to a user. In some embodiments, user interface module 308 is configured to display information on a screen (e.g., an LCD screen) integrated with energy transfer device 100 (e.g., within housing 110). In other embodiments, user interface module 308 is configured to display various types of information via an application running on the host device and/or the recipient device. In some embodiments user interface module 308 may include audio components such as a microphone to accept verbal input and/or a speaker to provide audible output.

For example, as will be discussed in greater detail below, user interface module 308 can be configured to display various energy parameters such as (1) present energy level (e.g., state of charge or percentage of full charge) of one or more devices, such as a host device and/or a recipient device; (2) energy transfer compatibility; (3) time until transfer is complete; (4) amount of energy already transferred (e.g., in absolute, percentage, or fractional terms); (5) an indication that transfer is complete; and/or (6) energy transfer rate, among others. User interface module 308 can also be configured to display various energy transfer parameters. In certain embodiments, energy transfer parameters are pre-programmed, preselected by a user, automatically selected by energy transfer device 100, and/or select via user interface module 308. For example, energy transfer parameters in various embodiments include (1) authorizations and/or restrictions to transfer or to receive energy; (2) desired amount of energy to be received by recipient device; (3) desired state of charge of recipient device; (4) time available for transfer; (5) desired amount of energy to be transferred by host device; and/or (6) desired (e.g., minimum) state of charge of host device, among others.

User interface module 308 facilitates the selection of various energy transfer options by a user. In some embodiments, user interface module 308 facilitates user input via one or more buttons or via a touchscreen display integrated into energy transfer device 100. In further embodiments user interface module 308 facilitates user input via an application running on the host device and/or the recipient device. Based on a user's selection, processing circuit 300 can then control energy transfer between the host device and the recipient device in accordance with the selected options.

Device interface module 310 facilitates the communication of various types of information between a device and controller 302 and/or between a host device and a recipient device. Upon connecting energy transfer device 100 to a portable device, device interface module 310 is configured to initiate communication (e.g., via wake-up commands) with that device. In some embodiments, the device interface module 310 is configured to transmit a series of queries to a device. For example, the device interface module 310 may query the device to obtain various information details, such as (1) device type (e.g., model, manufacturer, owner, etc.); (2) battery specifications (e.g., maximum energy or charge level); (3) energy transfer specifications (e.g., minimum and maximum voltage and current levels, and maximum energy transfer rates); and/or (4) present energy level (e.g., state of charge). In some embodiments, the query may be accompanied by other information, such as identification details for energy transfer device 100 and or identification details for the other portable device connected to energy transfer device 100; for instance the portable device may use this information to decide whether or not to transfer energy. In some embodiments, device interface module 310 is configured to receive various information details without transmitting a query; for instance the portable device(s) may proactively send the information details once they detect their connection to energy transfer device 100.

In some embodiments, device interface module 310 includes various security features to restrict certain types of information from being transferred between a host device and a recipient device. Because energy transfer device 100 includes a sophisticated processing circuit 300, certain users may be concerned that energy transfer device 100 may be capable of reading confidential information from a device to which it is connected. In some embodiments, device interface module 310 restricts data based on a modulation frequency. For example, certain embodiments may allow only continuous wave (CW) signals and/or signals with a modulation frequency below a predetermined threshold (e.g., 1 ms) to be transmitted. Thus, device interface module 310 prevents material amounts of confidential information from being transmitted.

Energy transfer module 312 manages various aspects of the transfer of energy between devices. For example, based on energy parameters (e.g., battery specifications) received from device interface module 310 as mentioned above, energy transfer module 312 converts the energy transferred from the host device so that it conforms to the specifications of the recipient device. Energy transfer module 312 is configured to control various components, such as a power converter (e.g., a DC-to-DC converter) to convert from one voltage to another, various regulator circuits to limit and/or control current and/or voltage (e.g., to maintain constant current and/or constant voltage), temperature regulators to limit maximum battery temperature, a rectifier to convert alternating current (AC) to direct current (DC), and/or a frequency converter to convert AC power of one frequency or time profile to another. Energy transfer module 312 can also be configured to take various dynamic impedance measurements at various current/voltage amplitudes and frequencies to determine tolerable current, voltage, and temperature levels during energy transfer. For example, impedance measurements can be cross-referenced to various battery models to determine appropriate energy transfer parameters (e.g., current, voltage, temperature).

Preference database 314 stores various energy transfer parameters and/or preferences. In various embodiments, energy transfer parameters and/or preferences are pre-loaded, programmed by a user, and/or learned based on past use with a device. In one embodiment, a user can program a device to react to the energy transfer device 100 in a specific manner, and/or program the energy transfer device 100 to react to certain other devices in a specific manner. For example, a user may specify whether or not a certain device should cooperate in transferring and/or receiving energy. This can depend on various factors, such as the particular device's own energy needs, it's "selfishness" (e.g., programmed to receive and/or transfer energy based on certain factors), and/or an identifier, such as an identifier of the energy transfer device 100 and/or an identifier of the other device to which the energy transfer device 100 is connected.

Upon connecting a device (e.g., first or second portable devices 114, 116) to energy transfer device 100, device interface module 310 is capable of determining various details regarding the particular connected device. For example, device interface module 310 can leverage various parameters and preferences stored in preference database 314 to determine that the device is a particular type of device (e.g., a laptop computer), that the device is a particular model of that type (e.g., a MacBook Air), and that it is a particular one of that type (e.g., Bob Jones's MacBook Air). Device interface module 310, via preference database 314, may also determine, for example, preferences for that device (e.g., Bob Jones's MacBook Air must retain a minimum of 20% state of charge and is only authorized to charge Bob Jones's other devices). It should be known that this example is merely illustrative and non-limiting.

Figure 4:
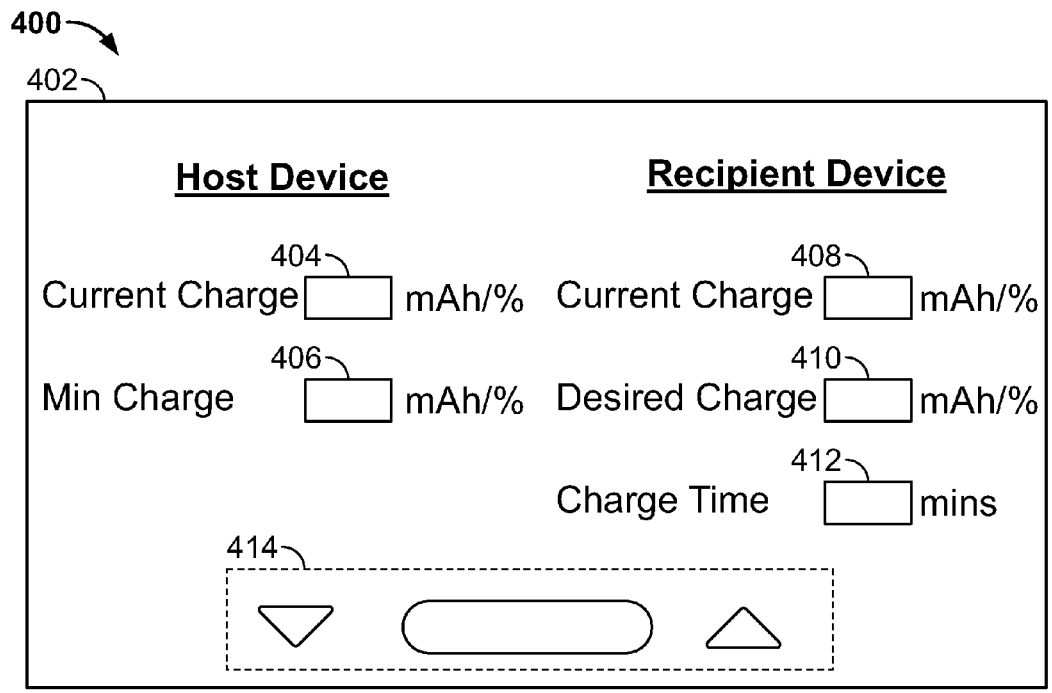
FIG. 4 is a front view of a display of an energy transfer device according to one embodiment.

FIG. 4 illustrates display 400 of an energy transfer device (e.g., energy transfer device 100 of FIG. 1) according to one embodiment. In some embodiments, display 400 is integrated into the energy transfer device, such as integrated into input/output device 112 of FIG. 1. In other embodiments, display 400 is integrated via an application running on the host device and/or the recipient device.

Display 400, in conjunction with user interface module 308, is configured to display various types of information to a user and/or to receive various types of inputs from a user. In some embodiments, display 400 includes screen 402, such as an LCD screen, for presenting to the user textual and/or graphical information regarding the energy level of the host and/or the recipient device. For example, screen 402 includes fields for displaying current charge level 404 and minimum charge level 406 of the host device; and current charge level 408, desired charge level 410, and charge time 412 of the recipient device.

Display 400 also includes buttons 414 for receiving various inputs from a user. In other embodiments, display 400 includes touch-sensitive features (e.g., a touch screen) through which display 400 can receive tactile inputs from a user. For example, in some embodiments, a user can specify desired charge 410 or charge time 412 to control energy transfer parameters for a recipient device. In other embodiments, various graphics and/or colors are utilized to indicate charge levels. For example, current charge level 408 of the recipient device can be represented by an outline of a battery that is darkened according to a state of charge of the recipient device.

Figure 5:
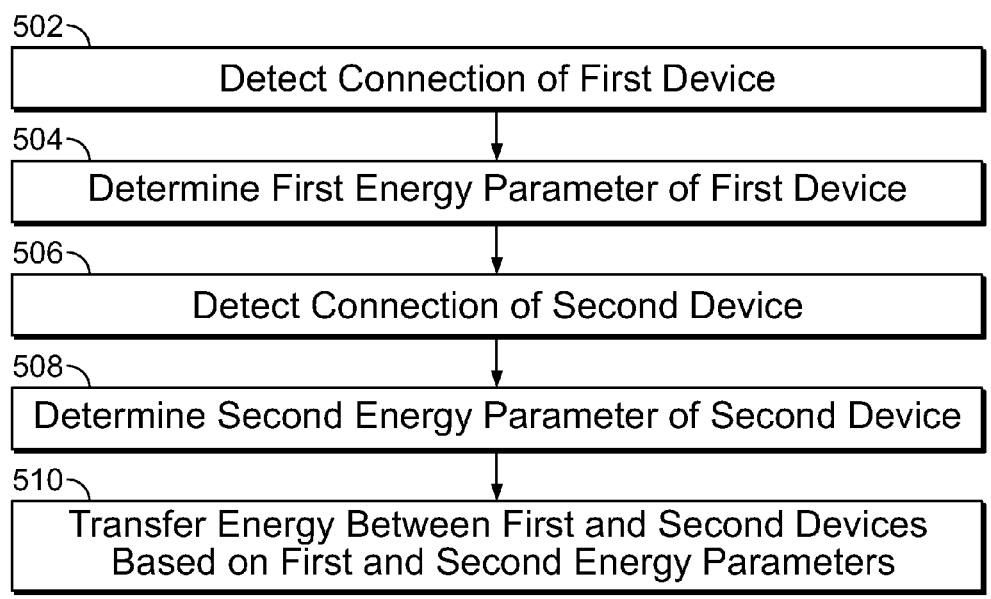
FIG. 5 is a flow diagram of a method of transferring energy according to one embodiment.

FIG. 5 is a flow diagram of a method of transferring energy performed by an energy transfer device, according to one embodiment. For illustrative purposes, FIG. 5 will be described in connection with energy transfer device 100 of FIG. 1. However, the method of FIG. 5 can be performed by other devices according to other embodiments.

At 502, energy transfer device 100 detects a connection to a first portable device (e.g., first portable device 114). For example, energy transfer device 100 may detect that first connector 104 is connected to a port of first portable device 114. At 504, upon connection to a first portable device, energy transfer device 100 determines various identifiers and/or energy parameters of the first portable device. For example, as mentioned above, energy transfer device 100 may send various queries to the first portable device to determine, for example, (1) an identifier (e.g., identification number); (2) device type (e.g., model, manufacturer, owner, etc.); (3) software type (e.g., operating system, power control program, battery handler, etc.); (4) battery specifications (e.g., maximum energy level); (5) energy transfer specifications (e.g., minimum and maximum voltage and current levels, and maximum energy transfer rates); and/or (6) present energy level (e.g., state of charge). In some embodiments, energy transfer device 100 cross-references an identifier of the first portable device with a database (e.g., preferences database 314) to determine energy parameters.

At 506, energy transfer device 100 detects a connection to a second portable device (e.g., second portable device 116). For example, energy transfer device 100 may detect that second connector 106 is connected to a port of second portable device 116. At 508, upon connection to a second portable device, energy transfer device 100 determines various identifiers and/or energy parameters of the second portable device, such as those mentioned above.

In some embodiments, energy transfer device 100 accepts user inputs of various energy transfer parameters, such as (1) authorization to transfer or to receive energy; (2) selection of the host device and the recipient device; (3) desired amount of energy to be received by recipient device; (4) desired state of charge of recipient device; (5) maximum time available for transfer; (6) desired amount of energy to be transferred by host device; (7) maximum state of charge of recipient device; (8) minimum state of charge of host device; and/or (9) desired state of charge of host device. In various embodiments, such inputs are received directly via energy transfer device 100 and/or via an application running on a portable device connected to energy transfer device 100. In some embodiments, energy transfer device 100 receives various energy transfer parameters directly from one or both of the portable devices connected to it. In some embodiments the energy transfer parameters are sent by a portable device in response to a query sent to it from energy transfer device 100. In other embodiments, the portable device(s) proactively send the energy transfer parameters, e.g., once they detect their connection to energy transfer device 100, once they determine their intent to donate or receive energy, etc.

At 510, energy transfer device 100 transfers energy between the first and second portable devices. Upon initiating energy transfer, energy transfer device 100 analyzes the energy parameters of the first portable device that were determined at 504 with those of the second portable device that were determined at 508. Energy transfer device 100 then analyzes any energy transfer parameters and determines the particular parameters that will control the actual transfer of energy between the first and second portable devices such that the energy transfer is within the specified capabilities of each of the first and second portable devices.

In some embodiments, energy transfer device 100 requires a user input to initiate energy transfer. In other embodiments, energy transfer device 100 automatically defines the device that has the most energy as the host device, which operates as an effective energy transfer request to transfer energy from the host device to the recipient device.

During the energy transfer process, energy transfer device 100 monitors the energy transferred from the host device to the recipient device to ensure that the proper amount of energy is transferred in the proper manner. If necessary, energy transfer device 100 (e.g., via energy transfer module 312) receives energy having a first energy parameter (e.g., voltage, current, energy transfer rate, power format, etc.) from the first portable device, converts the energy from the first energy parameter to the second energy parameter, and transmits the converted energy having the second energy parameter to the second portable device. Energy transfer device 100 stops transferring energy when energy transfer is complete. For example, energy transfer may be complete when an energy transfer completion indicator is activated. The energy transfer completion indicator may be activated, for example, when the requested amount of energy is transferred from the host device to the recipient device, when the recipient device reaches a maximum state of charge, when the host device reaches a predetermined minimum state of charge, when a time limit is reached, when the host device no longer has energy to transfer, and/or if one of the host or recipient devices is disconnected, among other events.

Figure 6:
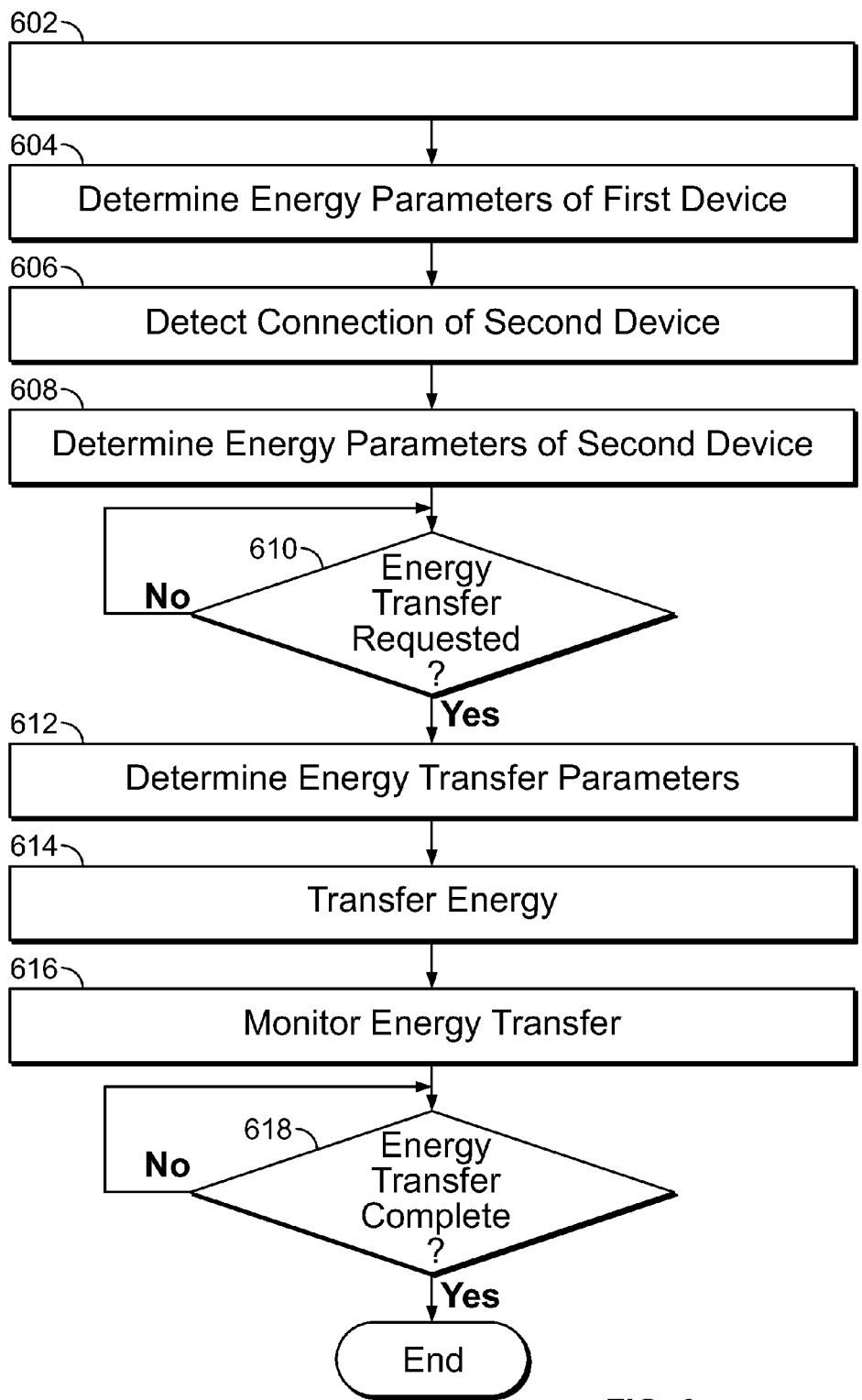
FIG. 6 is a flow diagram of a method of transferring energy according to one embodiment.

FIG. 6 is a flow diagram of a method of transferring energy according to an embodiment. For illustrative purposes, FIG. 6 will be described in connection with energy transfer device 100 of FIG. 1. However, the method of FIG. 6 can be performed by other devices according to other embodiments.

At 602, energy transfer device 100 detects a connection to a first portable device (e.g., first portable device 114). For example, energy transfer device 100 may detect that first connector 104 is connected to a port of first portable device 114. At 604, upon connection to a first portable device, energy transfer device 100 determines various energy parameters of the first portable device.

At 606, energy transfer device 100 detects a connection to a second portable device (e.g., second portable device 116). For example, energy transfer device 100 may detect that second connector 106 is connected to a port of second portable device 116. At 608, upon connection to a second portable device, energy transfer device 100 determines various energy parameters of the second portable device.

At 610 energy transfer device 100 determines if energy transfer between the first and second portable devices is requested. In some embodiments, energy transfer device 100 will display energy transfer parameters of each of the first and second portable devices and require user input to initiate energy transfer. For example, energy transfer device 100 may require a user to select which device is the host device and which device is the recipient device. In other embodiments, energy transfer device 100 may require a user to input various energy transfer parameters, such as (1) authorization to transfer or to receive energy; (2) desired amount of energy to be received by recipient device; (3) desired state of charge of recipient device; (4) time available for transfer; (5) desired amount of energy to be transferred by host device; and/or (6) desired state of charge of host device. In other embodiments, energy transfer device 100 automatically defines the device that has the most energy as the host device, or automatically defines the device that has the least energy as the recipient device.

At 612, energy transfer device 100 determines energy transfer parameters. Energy transfer device 100 compares the energy parameters of the first portable device that were determined at 604 with those of the second portable device that were determined at 608. Energy transfer device 100 then determines the parameters that will control the actual transfer of energy between the first and second portable devices such that the energy transfer is within the specified capabilities of each of the first and second portable devices. Energy transfer device 100 also determines which of the first and second portable devices is the host device and which is the recipient device, if that has not already been determined.

At 614, energy transfer device 100 transfers energy from the host device to the recipient device based on the energy transfer parameters determined at 612. At 616, energy transfer device monitors energy transferred from the host device to the recipient device to ensure that the proper amount of energy is transferred in the proper manner. At 618, energy transfer device 100 stops transferring energy when energy transfer is complete. In an embodiment, energy transfer is complete when an energy transfer completion indicator is activated. In certain embodiments, for example, the energy transfer completion indicator may be activated when the requested amount of energy is transferred from the host device to the recipient device, when the host device no longer has energy to transfer, and/or if one of the host or recipient devices is disconnected, among other events.

Figure 7:
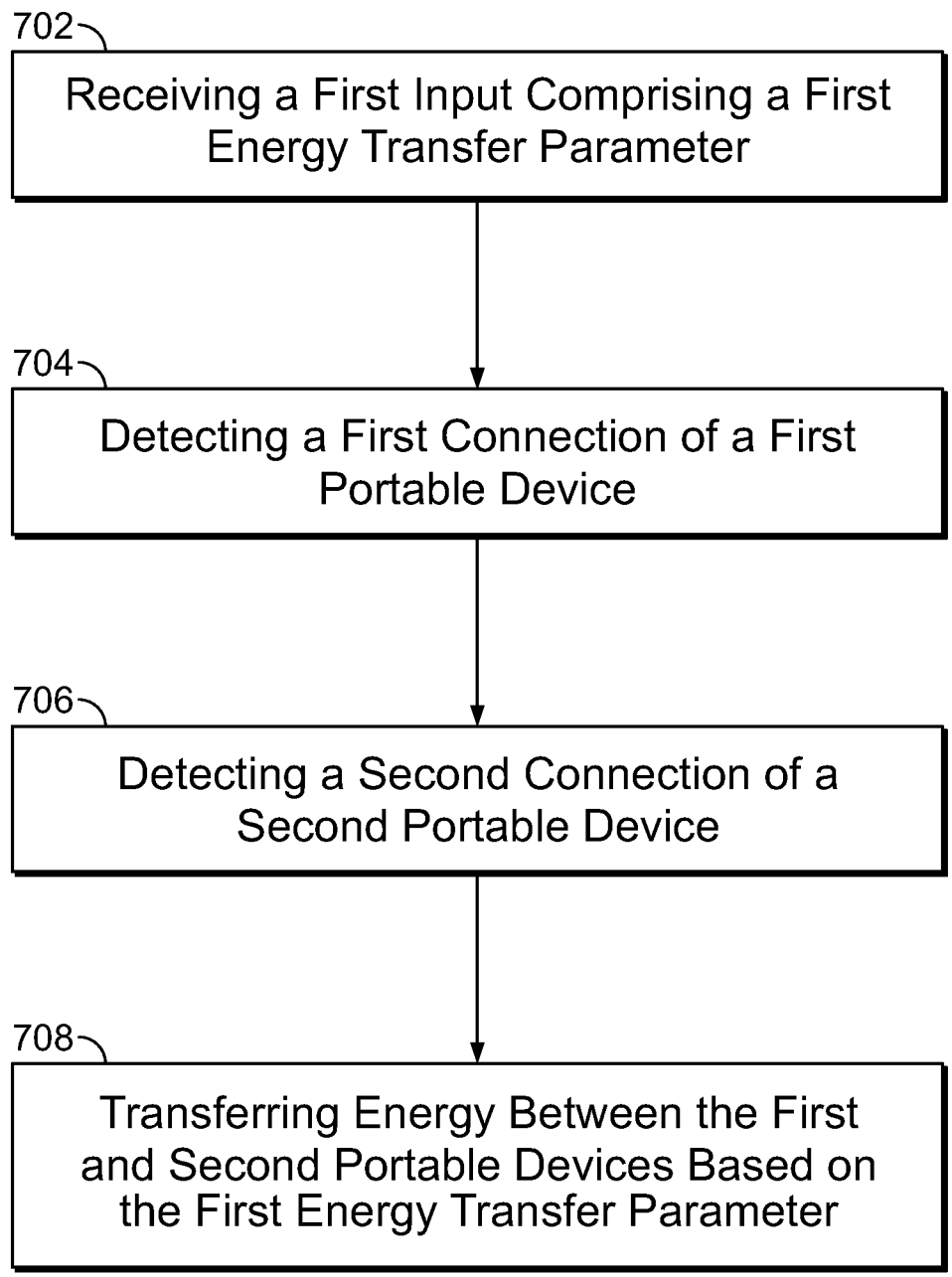
FIG. 7 is a flow diagram of a method of transferring energy according to one embodiment.

FIG. 7 is a flow diagram of a method of transferring energy performed by an energy transfer device, according to one embodiment. For illustrative purposes, FIG. 7 will be described in connection with energy transfer device 100 of FIG. 1. However, the method of FIG. 7 can be performed by other devices according to other embodiments. In certain embodiments, energy transfer device 100 can be programmed to operate in a certain manner with particular portable devices.

At 702, energy transfer device 100 receives a first input comprising a first energy transfer parameter. The first energy transfer parameter may be associated with a first portable device and, more specifically, with an identifier of the first portable device. In certain embodiments, energy transfer device 100 includes a set-up mode where users can input various energy transfer parameters and preferences, which can be stored in memory of energy transfer device 100 (e.g., via preference database 314).

It should be understood that energy transfer parameters may include any of various parameters. Those mentioned herein are merely illustrative and are not intended to be limiting. In some embodiments, energy transfer parameters may include authorizations and restrictions regarding particular devices, among many other things. For example, energy transfer parameters may specify that a particular device (1) always maintains a minimum state of charge; (2) never transfers and/or receives energy to/from other devices; (3) always transfers and/or receives energy to/from other devices; (4) never transfers and/or receives energy to/from other devices that have particular identifiers; (5) always transfers and/or receives energy to/from other devices that have particular identifiers; (6) transfers and/or receives energy based on one or more rules regarding a state of charge or other energy parameters of either device.

At 704, energy transfer device 100 detects a first connection of a first portable device. At 706, energy transfer device 100 detects a second connection of a second portable device. At 708, energy transfer device transfers energy between the first and second portable devices based at least on the first energy transfer parameter.

FIG. 8 illustrates energy transfer device 800 according to another embodiment. Energy transfer device 800 is operatively coupled to first portable device 114 and second portable device 116 to wirelessly transfer energy therebetween. Energy transfer device 800 operates similarly to energy transfer device 100 of FIG. 1, except energy transfer device 800 transfers energy via wireless signals whereas energy transfer device 100 of FIG. 1 transfers energy via cable 102. Energy transfer device 800 can use any of various wireless charging technologies, such as induction-based wireless charging, resonance-based wireless charging, radio-based wireless charging, and/or optically-based wireless charging, among others. In one embodiment, energy transfer device 800 is incorporated into a table-top to facilitate energy transfer between devices placed thereon. Energy transfer device 800 also includes control unit 802 to control parameters associated with energy transferred from a host device (e.g., first portable device 114) to a recipient device (e.g., second portable device 116). Control unit 802 may include any of the features of control unit 108 discussed elsewhere herein.

FIG. 9 illustrates energy transfer device 900 according to another embodiment. Energy transfer device 900 is operatively coupled to second portable device 116 via cable 902. Energy transfer device 900 operates similarly to energy transfer device 100 of FIG. 1, except energy transfer device 900 transmits and/or receives energy from a single device, whereas energy transfer device 100 of FIG. 1 transfers energy between two devices. Energy transfer device 900 includes control unit 904 to control parameters associated with energy transferred between energy transfer device 900 and second portable device 116. Control unit 904 includes internal battery 906, which may be larger than internal battery 120 of second portable device 116. For example, in one embodiment, internal battery 906 is about 3,000-30,000 mAh, whereas internal battery 120 of second portable device 116 is about 1,400-2,400 mAh. In an embodiment, internal battery 906 can be charged from an AC (alternating current) power source (e.g., a wall outlet) via cable 902 and an AC adapter (not shown). Control unit 902 may include any of the features of control unit 108 discussed elsewhere herein.

FIG. 10 is a flow diagram of a method 1000 of transferring energy from an energy transfer device, according to one embodiment. For illustrative purposes, FIG. 10 will be described in connection with energy transfer device 100 of FIGS. 1 and 2. However, the method 1000 can be performed by other devices, according to other embodiments.

At 1002, a connection of energy transfer device 100 to first portable device 114 is detected. For example, according to one embodiment, first portable device 114 detects first connector 104 being connected to a port of first portable device 114.

At 1004, a request for energy is received at first portable device 114 from energy transfer device 100. Energy transfer device 100 is also connected to second portable device 116, for example, via second connector 106. In one embodiment, second portable device 116 may transmit a request for energy to energy transfer device 100 and, based on the request from second portable device 116, energy transfer device 100 may transmit a corresponding request for energy to first portable device 114. For example, second portable device 116 may be running low on energy, and may request that first portable device 114 transfers some of its energy to second portable device 116, via energy transfer device 100.

At least one of first and second portable devices 114, 116 may provide certain information to energy transfer device 100 upon connection thereto, or in response to a query. For example, in one embodiment at least one of first and second energy transfer devices 114, 116 may provide at least one of an identifier, an energy parameter, an energy transfer parameter, or other information to energy transfer device 100. In addition, upon detecting the other of first and second portable devices 114, 116, energy transfer device 100 may transmit the information received to the respective device.

At 1006, it is determined whether to authorize the request. In some embodiments, the determination 1006 is made by energy transfer device 100, while in other embodiments, the determination 1006 is made by first portable device 114. The determination may be made based upon various factors. For example, the determination may be made based on the information (e.g., identifier, energy parameter, energy transfer parameter, etc.) mentioned above, upon a payment associated with the energy transfer, or upon other things.

At 1008, energy is transmitted from first portable device 114 to energy transfer device 100 if determination 1006 results in the request being approved. For example, in one embodiment, energy is further transmitted to second portable device 116 from energy transfer device 100. In another embodiment, at least a portion of the energy is stored by energy transfer device 100. In one embodiment, energy transfer is stopped when energy transfer is complete. For example, according to various embodiments, energy transfer may be considered complete when the requested amount of energy is transferred to second portable device 116 from first portable device 114, when first portable device 114 reaches a predetermined minimum state of charge, when second portable device 116 reaches a predetermined maximum state of charge, when a time limit is reached, when first portable device 114 no longer has energy to transfer, and/or if one of first and second portable devices 114, 116 is disconnected from energy transfer device 100, among other events. In some embodiments, the amount of energy transferred from first portable device 114 to energy transfer device 100 is less than the amount requested at 1004. For example, due to one of the reasons mentioned above, energy transfer may be stopped prior to the requested amount of energy being transmitted. In some embodiments, portable device 116 may provide or authorize a payment associated with the energy transfer from portable device 114. Payment may be made electronically, with the amount being debited from an account controlled by second portable device 116 or an owner or agent thereof. The account may reside on second portable device 116, on energy transfer device 100, or an external site. The payment amount may be credited to an account controlled by first portable device 114 or an owner or agent thereof. The account may reside on first portable device 114, on energy transfer device 100, or an external site.

FIG. 11 is a flow diagram of a method 1100 of receiving energy by a first portable device (e.g., first portable device 114, according to one embodiment). For illustrative purposes, FIG. 11 will be described in connection with first portable device 114 of FIG. 2. However, the method 1100 can be performed by other devices, according to other embodiments.

At 1102, first portable device 114 detects a connection of energy transfer device 100. For example, according to one embodiment, first portable device 114 detects first connector 104 being connected to a port of first portable device 114.

At 1104, first portable device 114 transmits a request for energy to energy transfer device 100. Energy transfer device 100 is also connected to second portable device 116, for example, via second connector 106. For example, first portable device 114 may be running low on energy, and may request that second portable device 116 transfers some of its energy to first portable device 114, via energy transfer device 110.

At 1106, first portable device 114 transmits at least one of an identifier, an energy parameter, and an energy transfer parameter to energy transfer device 100.

At 1108, first portable device 114 receives energy from energy transfer device 100. In some embodiments, energy is transferred to first portable device 114 from second portable device 116 via energy transfer device 100. In some embodiments, energy transfer device 100 or second portable device 116 determines whether to transfer energy to first portable device 114 based on various parameters. For example, the determination may be made based on the information (e.g., identifier, energy parameter, energy transfer parameter, etc.) transmitted at 1106, among other things. In some embodiments, first portable device 114 receives information (e.g., identifier, energy parameter, energy transfer parameter, etc.) from the energy transfer device 100 or the second portable device 116. First portable device 114 can use this received information to decide whether or not to authorize (i.e., to proceed with) reception of the energy. First portable device 114 can also base such an authorization decision upon its current charge state, upon its maximum allowed state of charge, upon a payment demanded by portable device 116 for the energy, etc.

In some embodiments, energy transfer is stopped when energy transfer is complete. For example, according to various embodiments, energy transfer may be considered complete when the requested amount of energy is transferred to first portable device 114, when first portable device 114 reaches a maximum state of charge, when second portable device 116 reaches a predetermined minimum state of charge, when a time limit is reached, when energy transfer device 100 and/or second portable device 116 no longer have energy to transfer, and/or if one of first and second portable devices 114, 116 is disconnected from energy transfer device 100, among other events. In some embodiments, the amount of energy transferred to first portable device 114 is less than the amount requested at 1004. For example, due to one of the reasons mentioned above, energy transfer may be stopped prior to the requested amount of energy being transmitted.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An energy transfer apparatus, comprising:
   a cable having a first end with a first connector operably coupled thereto and a second end with a second connector operably coupled thereto; and
   a control unit coupled to the cable, the control unit comprising:
   a memory device configured to store an energy transfer parameter associated with an identifier of a first portable device, the energy transfer parameter being preselected by a user;
   a device interface module configured to determine a first energy parameter of the first portable device, the first portable device being detachably connected to the cable via the first connector, and to determine a second energy parameter of a second portable device detachably connected to the cable via the second connector, the first energy parameter being the energy transfer parameter determined upon receiving the identifier from the first portable device; and
   an energy transfer module configured to facilitate energy transfer between the first and second portable devices based on the first and second energy parameters.

2. The apparatus of claim 1, wherein the device interface module is further configured to receive an energy delivery request from at least one of the first and second portable devices.

3. The apparatus of claim 1, wherein the device interface module is further configured to transmit a cable identifier associated with the cable to at least one of the first and second portable devices.

4. The apparatus of claim 1,
   wherein the identifier associated with the first portable device is a first identifier,
   wherein a second identifier is associated with the second portable device, and
   wherein the device interface module is further configured to transmit the first identifier to the second portable device.

5. The apparatus of claim 1, wherein the device interface module is further configured to transmit a query to at least one of the first and second portable devices to request the respective first or second energy parameter.

6. The apparatus of claim 1,
   wherein the identifier associated with the first portable device is a first identifier,
   wherein a second identifier is associated with the second portable device, and
   wherein the device interface module is further configured to transmit a query to at least one of the first and second portable devices to request the respective first or second identifier.

7. The apparatus of claim 1, wherein the memory device is further configured to store at least one of the first and second energy parameters.

8. The apparatus of claim 7,
   wherein the identifier associated with the first portable device is a first identifier,
   wherein a second identifier is associated with the second portable device, and
   wherein the memory device is further configured to store at least one of the first and second identifiers.

9. The apparatus of claim 7, wherein the memory device is further configured to store a cable identifier associated with the cable.

10. The apparatus of claim 1, wherein at least one of the first and second energy parameters includes a state of charge of the respective first or second portable device.

11. The apparatus of claim 1, wherein at least one of the first and second energy parameters includes maximum voltage and maximum current specifications of the respective first or second portable device.

12. The apparatus of claim 1, wherein at least one of the first and second energy parameters includes a maximum energy transfer rate of the respective first or second portable device.

13. The apparatus of claim 1, wherein the first portable device is a host device and the second portable device is a recipient device, wherein the energy transfer module is further configured to transfer energy from the host device to the recipient device.

14. The apparatus of claim 1, wherein the control unit is configured to receive an energy transfer parameter, and wherein the energy transfer between the first and second portable devices is further based on the energy transfer parameter.

15. The apparatus of claim 14, wherein the control unit further includes a user interface module configured to receive a first user input comprising the energy transfer parameter.

16. The apparatus of claim 14, wherein the energy transfer parameter includes a selection of one of the first and second portable devices as a host device, the other of the first and second portable devices being a recipient device, wherein the energy transfer module is further configured to transfer energy from the host device to the recipient device.

17. The apparatus of claim 1, wherein the energy transfer module is further configured to convert the energy transferred between the first and second portable devices between a first voltage and a second voltage.

18. The apparatus of claim 1, wherein the energy transfer module is further configured to convert the energy transferred between the first and second portable devices between a first current and a second current.

19. A method of transferring energy between portable devices, comprising:
storing, by an energy transfer device, an energy transfer parameter associated with an identifier of a first portable device, the energy transfer parameter being preselected by a user;
detecting, by the energy transfer device, a first connection of the first portable device;
receiving, by the energy transfer device, the identifier from the first portable device;
determining, by the energy transfer device, a first energy parameter of the first portable device upon receiving the identifier from the first portable device, the first energy parameter being the energy transfer parameter;
detecting, by the energy transfer device, a second connection of a second portable device;
determining, by the energy transfer device, a second energy parameter of the second portable device; and
transferring, by the energy transfer device, energy between the first and second portable devices based on the first and second energy parameters.

20. The method of claim 19, wherein the transferring of energy between the first and second portable devices includes:
receiving first energy from the first portable device, the first energy having the first energy parameter;
converting the first energy to second energy, the second energy having the second energy parameter; and
transmitting the second energy to the second portable device.

21. The method of claim 19, further comprising:
upon detecting at least one of the first connection and the second connection, transmitting a query to the respective portable device, the query comprising a request for the respective energy parameter.

22. The method of claim 19, further comprising determining an energy transfer parameter, wherein the transferring of energy between the first and second portable devices is further based on the energy transfer parameter.

23. The method of claim 22, further comprising upon detecting at least one of the first connection and the second connection, transmitting a query to the respective portable device, the query comprising a request for the energy transfer parameter.

24. The method of claim 22, wherein the energy transfer parameter identifies one of the first and the second portable devices as a host device, and the other of the first and second portable devices as a recipient device, wherein the transferring of energy between the first and second portable devices includes transferring energy from the host device to the recipient device.

25. The method of claim 22, wherein the energy transfer parameter includes an energy transfer authorization.

26. The method of claim 22, further comprising:
monitoring the transferring of energy between the first and second portable devices; and
stopping the transferring of energy between the first and second portable devices based on the energy transfer parameter.

27. A method of transferring energy between portable devices, comprising:
storing, by an energy transfer device, an energy transfer parameter associated with an identifier of a first portable device, the energy transfer parameter being preselected by a user;
receiving, by the energy transfer device, the identifier from the first portable device;
determining a first energy parameter of a first portable device upon receiving the identifier from the first portable device, the first energy parameter being the energy transfer parameter;
determining a second energy parameter of a second portable device;
determining an energy transfer parameter;
transferring energy between the first and second portable devices based on the first and second energy parameters and further based on the energy transfer parameter;
monitoring the transferring of energy between the first and second portable devices; and
stopping the transferring of energy between the first and second portable devices upon detecting an energy transfer completion indicator.

28. The method of claim 27, further comprising receiving at least one of the first energy parameter and the second energy parameter from the respective portable device.

29. The method of claim 27, further comprising transmitting a query to at least one of the first portable device and the second portable device, wherein the query comprises a request for the respective energy parameter.

30. The method of claim 27, wherein the transferring of energy between the first and second portable devices includes:
receiving first energy from the first portable device, the first energy having the first energy parameter;
converting the first energy to second energy, the second energy having the second energy parameter; and
transmitting the second energy to the second portable device.

31. The method of claim 27, further comprising:
upon detecting at least one of a first connection with the first portable device and a second connection with the second portable device, transmitting a wake-up command to the respective portable device.

32. The method of claim 27, further comprising identifying one of the first and the second portable devices as a host device, the other of the first and second portable devices being a recipient device, wherein the transferring of energy between the first and second portable devices includes transferring energy from the host device to the recipient device.

33. The method of claim 27, wherein transferring energy between the first and second portable devices comprises converting the energy between a first voltage and a second voltage.

34. The method of claim 27, wherein transferring energy between the first and second portable devices comprises converting the energy between a first current and a second current.

35. The method of claim 27, wherein transferring energy between the first and second portable devices comprises converting the energy between a first time profile and a second time profile.

* * * * *